(12) United States Patent
Abhishek et al.

(10) Patent No.: US 12,044,845 B2
(45) Date of Patent: Jul. 23, 2024

(54) TOWARDS SUBSIDING MOTION SICKNESS FOR VIEWPORT SHARING FOR TELECONFERENCING AND TELEPRESENCE FOR REMOTE TERMINALS

(71) Applicant: TENCENT AMERICA LLC, Palo Alto, CA (US)

(72) Inventors: Rohit Abhishek, San Jose, CA (US); Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/698,082

(22) Filed: Mar. 18, 2022

(65) Prior Publication Data
US 2022/0308341 A1 Sep. 29, 2022

Related U.S. Application Data

(60) Provisional application No. 63/167,304, filed on Mar. 29, 2021.

(51) Int. Cl.
*G02B 27/00* (2006.01)
*H04L 65/60* (2022.01)
(Continued)

(52) U.S. Cl.
CPC ..... *G02B 27/0093* (2013.01); *G02B 27/0075* (2013.01); *H04L 65/65* (2022.05); *H04L 65/75* (2022.05)

(58) Field of Classification Search
CPC . G02B 27/0093; G02B 27/0075; H04L 65/65; H04L 65/75; H04L 65/403; H04L 65/765
See application file for complete search history.

(56) References Cited

U.S. PATENT DOCUMENTS 9,645,395 B2 * 5/2017 Bolas ................. G02B 27/0093
11,258,999 B2 * 2/2022 Rao Padebettu .... H04N 13/178
(Continued)

FOREIGN PATENT DOCUMENTS

CN 110384921 A 10/2019
JP 2019-511781 A 4/2019
(Continued)

OTHER PUBLICATIONS

International Search Report issued Jul. 26, 2022 in International Application No. PCT/US2022/021675.
(Continued)

*Primary Examiner* — Bryan Earles
(74) *Attorney, Agent, or Firm* — Sughrue Mion, PLLC

(57) ABSTRACT

A method and device for subsiding motion sickness when a user is following the viewport of another user in a streaming session is provided. The method includes determining a field of view (FoV) of the user, based on a speed of a FoV of the user being followed. The FoV of the user being followed is an original FoV without any reduction. Further, the method includes generating a modified first FoV by at least one of (1) reducing the FoV of the user based on the speed of the FoV of the user being followed increasing, and (2) increasing the FoV of the user based on the speed of the FoV of the user being followed decreasing, and transmitting the modified first FoV to the user as a new viewport.

13 Claims, 8 Drawing Sheets

(51) Int. Cl.
*H04L 65/65* (2022.01)
*H04L 65/75* (2022.01)

(56) References Cited

U.S. PATENT DOCUMENTS

| | | | |
|---|---|---|---|
| 2016/0133170 A1* | 5/2016 | Fateh | G06F 3/04817 345/428 |
| 2017/0269713 A1* | 9/2017 | Marks | G06F 3/013 |
| 2018/0096518 A1* | 4/2018 | Mallinson | G02B 27/0093 |
| 2019/0057529 A1 | 2/2019 | DiVerdi et al. | |
| 2019/0172410 A1 | 6/2019 | Okumura | |
| 2019/0236836 A1 | 8/2019 | Mallinson | |
| 2022/0084301 A1* | 3/2022 | Joshi | G06T 15/20 |

FOREIGN PATENT DOCUMENTS

| | | |
|---|---|---|
| JP | 2020-502603 A | 1/2020 |
| WO | 2017/161297 A1 | 9/2017 |
| WO | 2017/183279 A1 | 10/2017 |
| WO | 2019/074228 A2 | 4/2019 |

OTHER PUBLICATIONS

Written Opinion of the International Searching Authority issued Jul. 26, 2022 in International Application No. PCT/US2022/021675.
ITT4RT Permanent Document—Requirements, Working Assumptions and Potential Solutions: 3GPP TSG-S4-200840.
Information technology—Coded representation of immersive media—Part 2: Omnidirectional MediA Format (OMAF) 2nd Edition.
Extended European Search Report dated Jun. 12, 2023 issued by the European Patent Office in application No. 22760637.3.
Communication dated Dec. 25, 2023, issued in Japanese Application No. 2022-566708.
Office Action issued May 7, 2024 in Japanese Application No. 2022-566708.

\* cited by examiner

TOWARDS SUBSIDING MOTION SICKNESS FOR VIEWPORT SHARING FOR TELECONFERENCING AND TELEPRESENCE FOR REMOTE TERMINALS

CROSS-REFERENCE TO RELATED APPLICATION

This application is based on and claims priority to U.S. Provisional Patent Application No. 63/167,304, filed on Mar. 29, 2021, the disclosure of which is incorporated by reference herein in its entirety.

FIELD

Embodiments of the present disclosure relate to subsiding motion sickness in teleconferencing and telepresence for remote terminals, and more specifically relate to subsiding motion sickness of a user when the user is following another user's viewport.

BACKGROUND

When an omnidirectional media stream is used, only part of the content corresponding to the user's viewport is rendered, while using a head-mounted display (HMD), giving the user a realistic view of the media stream.

FIG. 1 illustrates a related scenario (scenario 1) for an immersive teleconference call, where the call is organized among Room A (101), User B (102), and User C (103). As shown in FIG. 1, Room A (101) represents a conference room with an omnidirectional/360-degree camera (104), and User B (102) and User C (103) are remote participants using an HMD and mobile devices, respectively. In this case, participants User B (102) and User C (103) send their viewport orientation to Room A (101), which in turn sends User B (102) and User C (103) the viewport dependent stream.

An extended scenario (scenario 2) is shown in FIG. 2A which includes multiple conference rooms (2a01, 2a02, 2a03, 2a04). User B (2a06) uses an HMD to view a video stream from the 360-degree camera (104), and User C (2a07) uses a mobile device to view the video stream. User B (2a06) and User C (2a07) send their viewport orientation to at least one of the conference rooms (2a01, 2a02, 2a03, 2a04), which in turn sends User B (2a06) and User C (2a07) the viewport dependent stream.

As shown in FIG. 2B, another example scenario (scenario 3) is when the call is set up using an MRF/MCU (2b05) where the Media Resource Function (MRF) and the Media Control Unit (MCU) are multimedia servers that provide media-related functions for bridging terminals in a multi-party conference call. The conference rooms may send their respective videos to the MRF/MCU (2b05). These videos are viewport independent videos, i.e., the entire 360-degree video is sent to the media-server (i.e., the MRF/MCU) irrespective of the user's viewport streaming the particular video. The media server receives the viewport orientation of the users (User B (2b06) and User C (2b07)) and accordingly sends the users the viewport-dependent streams.

Further to scenario 3, the remote users can choose to view one of the available 360-degree videos from the conference rooms (2a01-2a04, 2b01-2b04). In such a case, the user sends the information about the video it would like to stream and its viewport orientation to the conference room or the MRF/MCU (2b05). The user can also trigger switching from one room to another based on the active speaker.

Another extension to the above scenarios is, for example, when a User A wearing an HMD is interested in following the viewport of another user. For this specific example, the other user will be User B (102). This may happen when User B (102) is presenting to the conference room (Room A, 2a01, 2a02, 2a03, and/or 2a04) or User A is interested in User B's (102) focus or viewport. However, when this happens and User A's viewport is switched, User A may suffer from motion sickness.

SUMMARY

One or more example embodiments of the present disclosure provide a system and method for subsiding motion sickness when viewport sharing in teleconferencing and telepresence for remote terminals.

According to embodiments, a method for subsiding motion sickness when a first user is following the viewport of a second user in a streaming session is provided. The method may include determining a first field of view (FoV), based on a speed of a FoV of the second user, wherein the FoV of the second user is an original FoV without any reduction, generating a modified first FoV by at least one of reducing the first FoV based on the speed of the FoV of the second user increasing, and increasing the first FoV based on the speed of the FoV of the second user decreasing, and transmitting the modified first FoV to the first user and presenting the modified first FoV to the first user as a new viewport.

According to embodiments, a device for subsiding motion sickness when a first user is following the viewport of a second user is provided. The device may include one or more memory configured to store program code and one or more processors configured read the program code and operate as instructed by the program code. The program code including determining code configured to cause the at least one processor to determine a first field of view (FoV), based on a speed of a FoV of the second user, wherein the FoV of the second user is an original FoV without any reduction, modifying code configured to cause the at least one processor to generate a modified first FoV by at least one of reducing the first FoV based on the speed of the FoV of the second user increases, and increasing the first FoV based on the speed of the FoV of the second user decreases, and transmitting code configured to cause the at least one processor to transmit the modified first FoV to the first user and present the modified first FoV to the first user as a new viewport.

According to embodiments, a non-transitory computer readable medium for subsiding motion sickness when a first user is following the viewport of a second user is provided. The computer readable medium may be connected to one or more processors and may be configured to store instructions that, when executed by at least one processor of a device, cause the at least one or more processors to determine a first field of view (FoV), based on a speed of a FoV of the second user, wherein the FoV of the second user is an original FoV without any reduction, generating a modified first FoV by at least one of reducing the first FoV based on the speed of the FoV of the second user increasing, and increase the first FoV based on the speed of the FoV of the second user decreasing, and transmit the modified first FoV to the first user and present the modified first FoV to the first user as a new viewport.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

The present disclosure relates to a method and apparatus for subsiding motion sickness when a user is following the viewport of another user.

Figure 1:
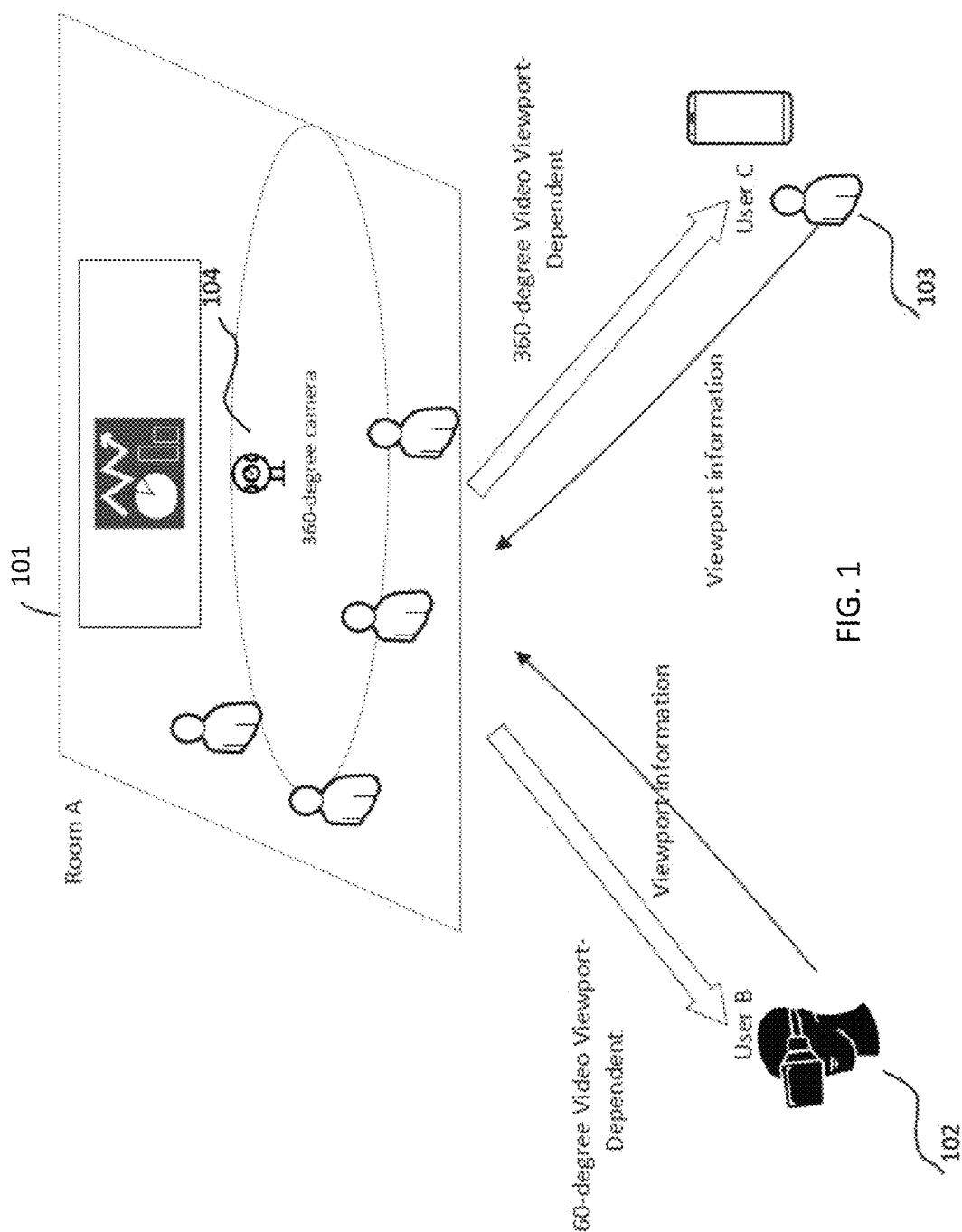
FIG. 1 is a schematic illustration of the ecosystem for immersive teleconferencing.
Figure 2A:
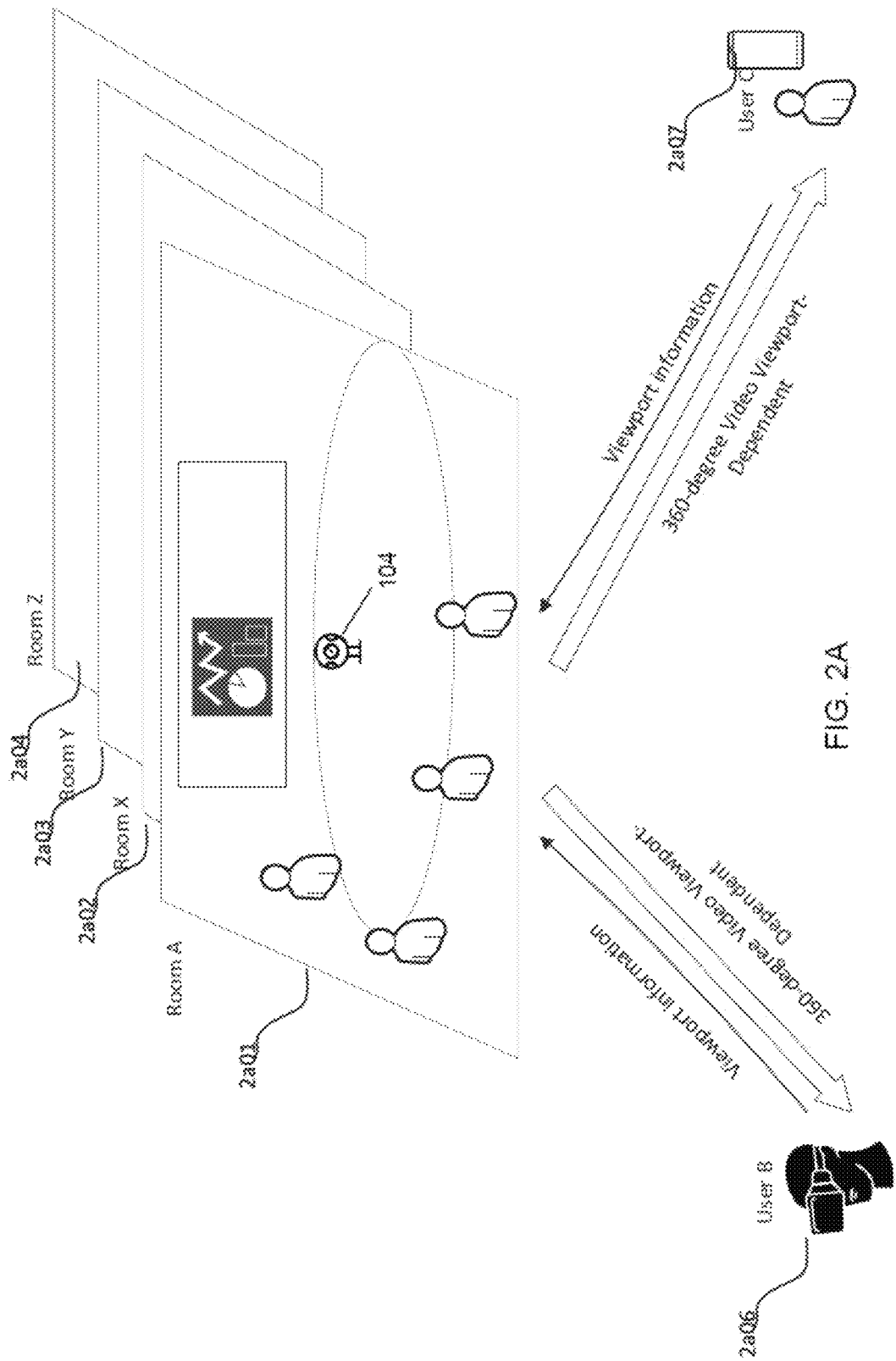
FIG. 2A is a schematic illustration of multiparty multi-conference room teleconferencing.
Figure 2B:
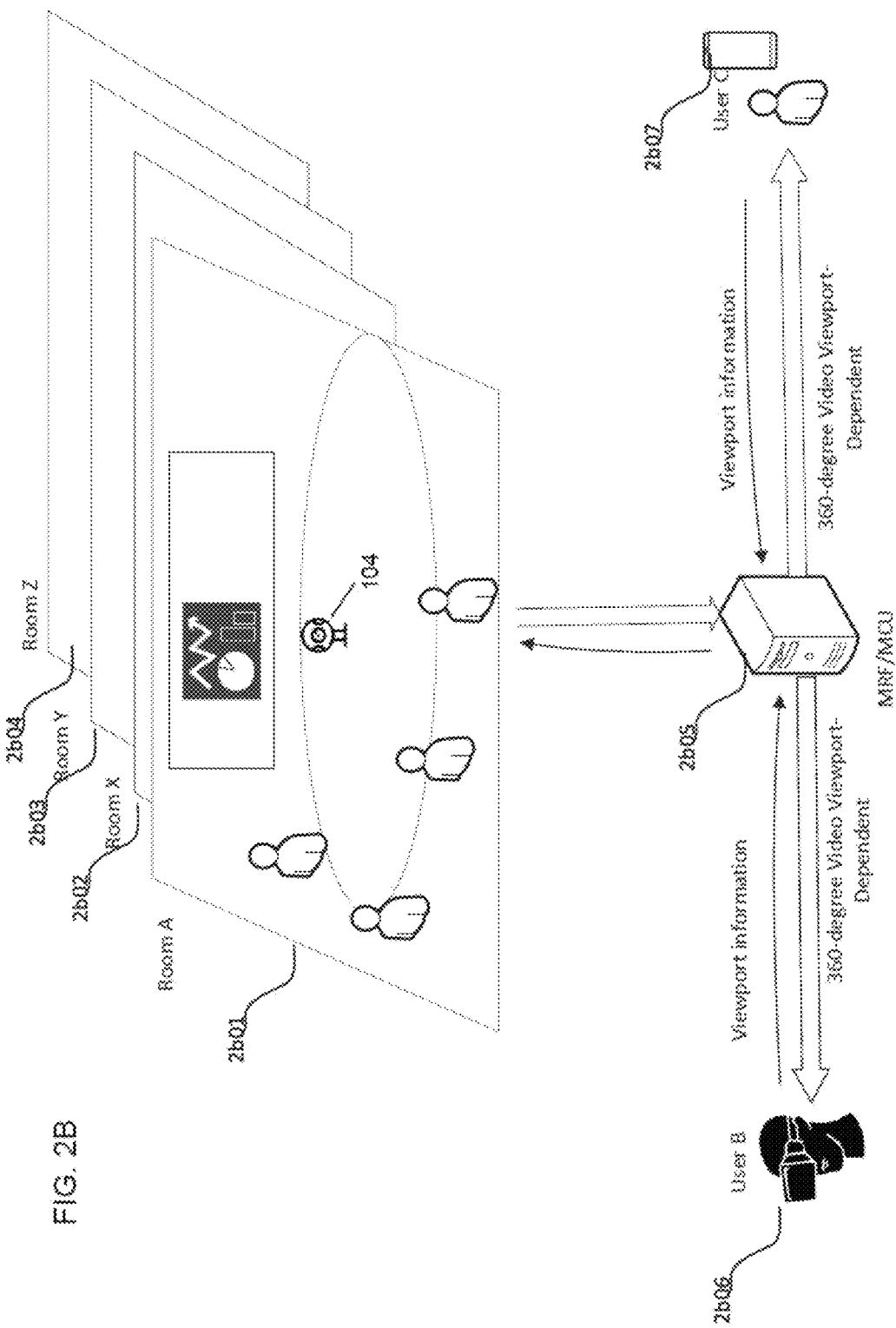
FIG. 2B is a schematic illustration of multiparty multi-conference room teleconferencing using MRF/MCU.

Motion sickness occurs when the human eye is unable to reconcile the movement seen with real body movements. The brain gets confused by the difference in information received from your balance organs in your inner ear and the eyes. This phenomenon is common in immersive video and affects immersive video streaming and immersive teleconferencing. As shown in FIG. 2A and FIG. 2B, multiple conference rooms with an omnidirectional camera are in a teleconference. A user may choose a video stream from one of the conference rooms (2a01, 2a02, 2a03, 2a04) or the viewport of another user participating in the teleconference to be displayed as an immersive stream.

Embodiments of the present disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale. A same reference numeral in the accompanying drawings represents same or similar components, and therefore repeated descriptions of the components are omitted.

The proposed features discussed below may be used separately or combined in any order. Some block diagrams shown in the accompany drawings are functional entities and do not necessarily correspond to physically or logically independent entities. Further, the embodiments may be implemented by processing circuitry (e.g., one or more processors or one or more integrated circuits) or implemented in the form of software, or implemented in different networks and/or processor apparatuses and/or microcontroller apparatuses. In one example, the one or more processors execute a program that is stored in a non-transitory computer-readable medium.

Figure 3:
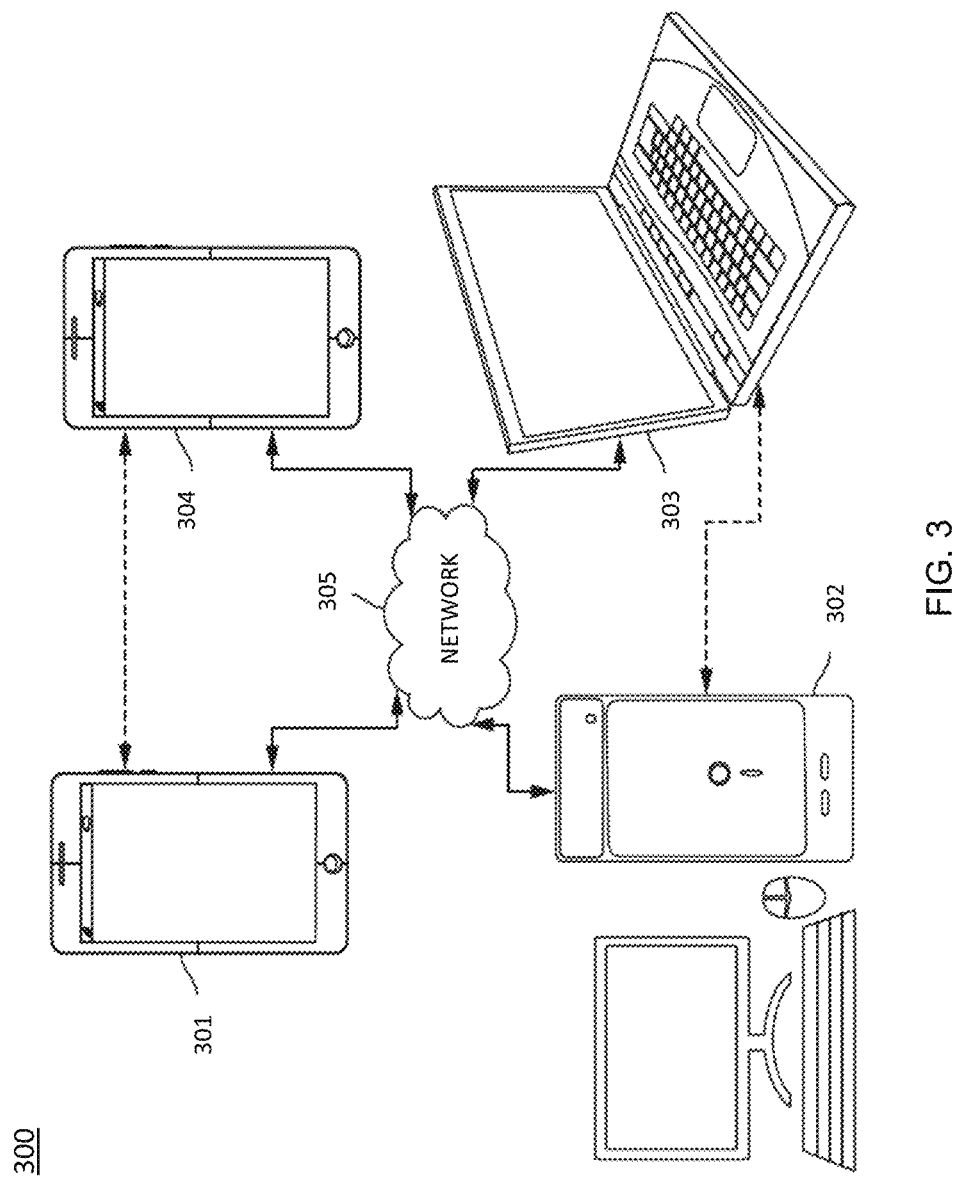
FIG. 3 is a simplified block diagram of a communication system, according to one or more embodiments.

FIG. 3 is a simplified block diagram of a communication system (300) according to embodiments of the present disclosure. The communication system (300) may include at least two terminals (302, 303) interconnected via a network (305). For unidirectional transmission of data, a first terminal (303) may code video data at a local location for transmission to the other terminal (302) via the network (305). The second terminal (302) may receive the coded video data of the other terminal from the network (305), decode the coded data and display the recovered video data. Unidirectional data transmission may be common in media serving applications such as teleconferencing and the like.

FIG. 3 illustrates a second pair of terminals (301, 304) provided to support bidirectional transmission of coded video that may occur, for example, during videoconferencing. For bidirectional transmission of data, each terminal (301, 304) may code video data captured at a local location for transmission to the other terminal via the network (305). Each terminal (301, 304) also may receive the coded video data transmitted by the other terminal, may display the recovered video data at a local display device.

In FIG. 3, the terminals (301, 302, 303, 304) may be illustrated as servers, personal computers, and mobile devices but the principles of the present disclosure are not limited to this. Embodiments of the present disclosure find application with laptop computers, tablet computers, HMDs, other media players, and/or dedicated video conferencing equipment. The network (305) represents any number of networks that convey coded video data among the terminals (301, 302, 303, 304), including for example wireline and/or wireless communication networks. The communication network (305) may exchange data in circuit-switched and/or packet-switched channels. Representative networks include telecommunications networks, local area networks, wide area networks and/or the Internet. The immersive videos discussed in embodiments of the present disclosure may be sent and/or received the network (305) or the like.

Figure 4:
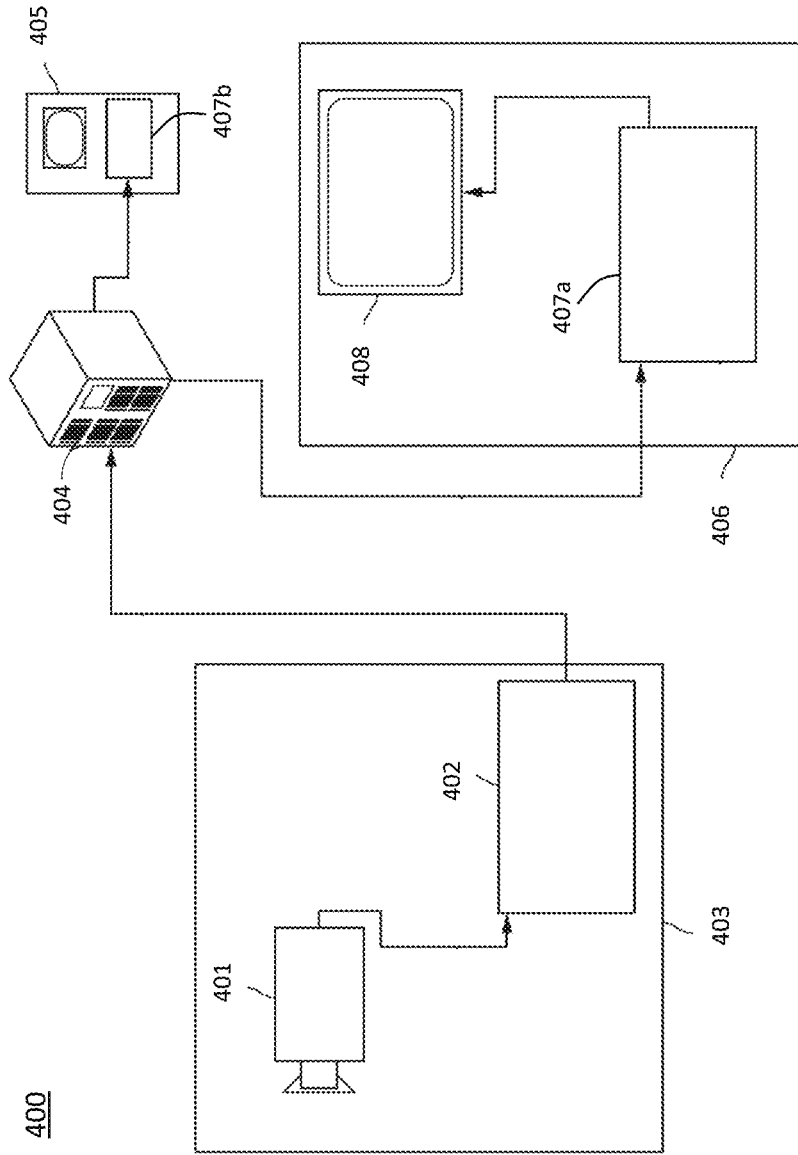
FIG. 4 is a simplified example illustration of a streaming environment, according to one or more embodiments.

FIG. 4 illustrates an example streaming environment for an application for the disclosed subject matter. The disclosed subject matter can be equally applicable to other video enabled applications, including, for example, immersive teleconferencing, video teleconferencing and telepresence, and so on.

A streaming environment may include one or more conference rooms (403), that may include a video source (401), for example a video camera and one or more participants of the conference (402). The video source (401) illustrated in FIG. 4 is a 360-degree video camera that may, for example, create a video sample stream. The video sample stream may be sent to and/or stored on a streaming server (404) for future use. One or more streaming clients (405, 406) may also send their respective viewport information to the streaming server (404). Based on the viewport information, the streaming server (404) may send a viewport dependent stream to the corresponding streaming clients (405, 406). In another example embodiment, the streaming clients (405, 406) may access the streaming server (404) to retrieve the viewport dependent stream. Embodiments are not limited to this configuration, the one or more conference rooms (403) may communication with the streaming clients (405, 406) via a network (e.g., network 305). Additionally, the streaming server (404) and/or streaming clients (405, 406) may include hardware, software, or a combination thereof to enable or implement aspects of the disclosed subject matter as described in more detail below. The streaming clients (405, 406) may include FoV (field of view) components (407a, 407b). The FoV components (407a, 407b) may adjust the viewport or FoV of the streaming client according to embodiments described in more detail below, and create an outgoing video sample stream that can be rendered on a display 408 or other rendering device such as an HDM, speaker, mobile device, and so on.

In an immersive teleconferencing call, streaming clients (hereafter "user") may choose to switch between one or none of the available immersive videos from multiple rooms streaming 360-degree video (e.g., one or more conference rooms (403)). The immersive video may be switched from one room streaming immersive video to another room streaming immersive video, either automatically or manually. When the immersive video is manually switched by the user from one source to another, the user may be prepared for the switch. Therefore, the chances of the user getting motion sickness may be reduced. However, when the video is switched automatically, the user may not be prepared for the switch and may cause the user to experience motion sickness. For example, when the viewport of user A is automatically switched to follow the viewport of another user B. When this happens, user A's eye is not able to reconcile the movement in the viewport of user B with the information received by user A's internal ear and/or eyes.

In some embodiments, when user A is following the viewport of another user B, the FoV of user A is reduced in order to subside the effect of motion sickness and provide user A with more visual comfort. The FoV may be defined as a function of the HMD speed/dynamicity of the FoV of the user being followed. Thus, the FoV of user A may be adjusted accordingly to effectively reduce the effect of motion sickness due to user A following the viewport of another user B. For example, when the HMD speed/dynamicity of the FoV of user B (which is being followed by user A) increases, the FoV of user A may be reduced. In the same or another example embodiment, when the HMD speed/dynamicity of the FoV of user B (which is being followed by user A) decreases, the FoV of user A may be increased.

Figure 5:
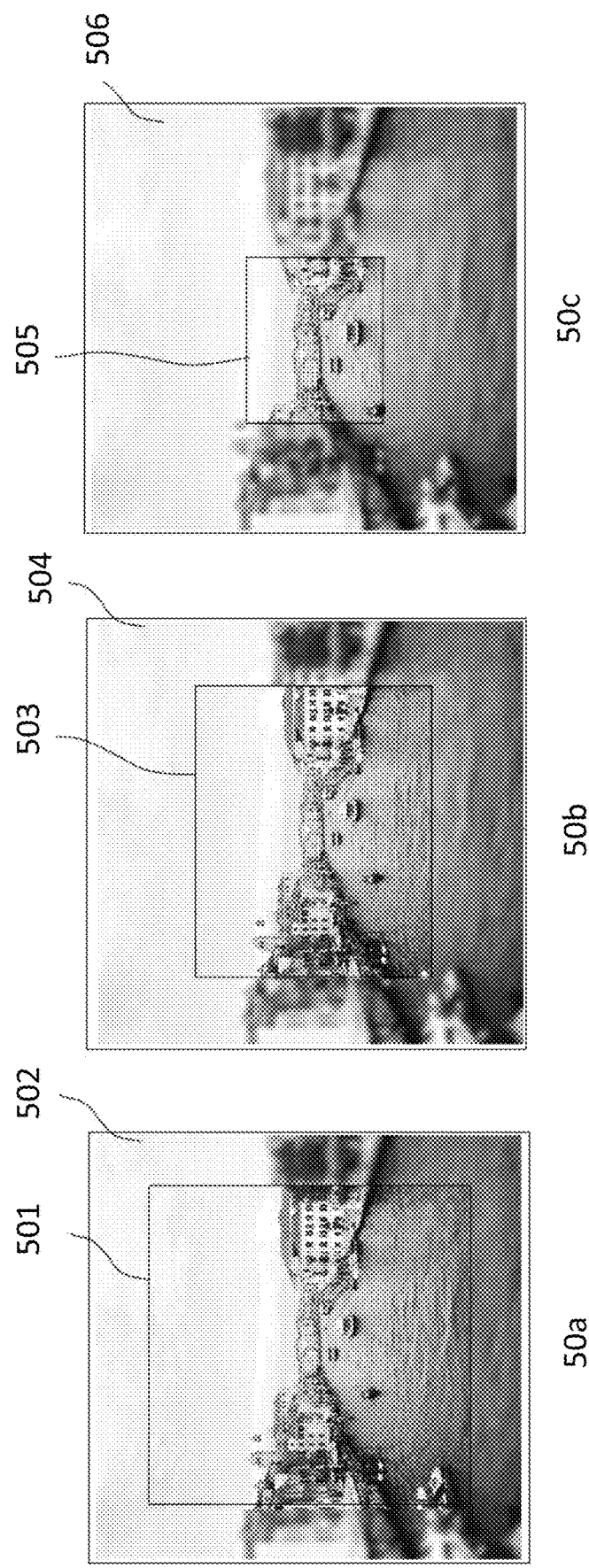
FIG. 5 is a schematic of a change in field of view (FoV), according to embodiments.

FIG. 5 illustrates changes in the FoV of a user A following another user B, wherein the HMD speed/dynamicity of the FoV of the another user B is increasing.

As shown in FIG. 5, images (50a, 50b, 50c) are illustrated with varying levels of HMD speed/dynamicity of the FoV of the user B who is being followed. Each of the images (50a, 50b, and 50c) contain high resolution portions (501, 503, 505) and low resolution portions (502, 504, 506). The high resolution portions (501, 503, 505) and low resolution portions (502, 504, 506) of the respective images (50a, 50b, 50c) are based on the HMD speed/dynamicity of the FoV of the user B. According to FIG. 5, the HMD speed/dynamicity of the FoV in image 50a is less than the HMD speed/dynamicity of the FoV in image 50b, and the HMD speed/dynamicity of the FoV in image 50b is less than the HMD speed/dynamicity of the FoV in image 50c (i.e., HMD speed in image 50a<50b<50c). The high resolution portions (501, 503, 505) of the images (50a, 50b, 50c) may be reduced according to an increase in the HMD speed/dynamicity of the FoV to alleviate the effects of motion sickness when user A's viewport is changed to the viewport of user B. Thus, the high resolution portion 501 in the image 50a is greater than the high resolution portion 503 in the image 50b, and the high resolution portion 503 is greater than the high resolution portion 505 in the image 50c (i.e., high resolution portion 501>503>505). The high resolution portion of the image increases as the HMD speed/dynamicity reduces. Likewise, the low resolution portion of the image reduces as the HMD speed/dynamicity reduces.

In the same or another embodiment, when user A's FoV is reduced, the region between the initial FoV (without reduction) and the reduced FoV (hereafter "$FoV_{Reduced}$") may be transmitted in low resolution. For example, with reference to image 50a in FIG. 5, when user A's FoV is reduced to the high resolution portion 501, the region between the initial FoV (i.e., image 50a) without reduction and the $FoV_{Reduced}$ (i.e., high resolution portion 501) may be transmitted in low resolution (i.e., low resolution portion 502).

In the same or another embodiment, when user A's FoV is reduced, only the $FoV_{Reduced}$ may be transmitted to the user A in high resolution, low resolution, or a combination thereof.

In the same or another embodiment, a reducing factor $\lambda$ may be defined. The value of the reducing factor $\lambda$ may be applied to the initial or original FoV to get the $FOV_{Reduced}$ (e.g., the high resolution portions 501, 503, and/or 505) that is intended to ensure better visual comfort for the user who is changing their view (e.g., user A who is changing their view to another user B's view). The relationship between the $FOV_{Reduced}$ and the reducing factor $\lambda$ may be desrbided using the following equation:

$$FoV_{Reduced} = \lambda FoV/HMD\ Speed \quad (1)$$

In the same or another embodiment, a minimum value of the reduced FoV (hereafter "$FoV_{Min}$") may be defined for user A so as not to interfere with the immersiveness. For example, reducing the FoV too much would have an impact on user acceptability and interfere with the immersivness of the video. Therefore, $FoV_{Min}$ is less than or equal to $FoV_{Reduced}$, as described below:

$$FoV_{Min} \Leftarrow FOV_{Reduced} \quad (2)$$

In the same or another embodiment, the reducing factor $\lambda$ may have values between 1 and ($FoV_{Min}$/FoV), and linearly decreasing weights between the extreme ends. A reducing factor $\lambda$ with a value of 1 means the client is prone to motion sickness. The value of the reducing factor $\lambda$ may be set by the user following the viewport (e.g., user A). Accordingly, the reducing factor $\lambda$ gives the receiving user the control to define the reduction in their FoV.

According to embodiments, user A, prior to receiving the FoV of user B, needs to convey a value of the reducing factor $\lambda$ and the $FoV_{min}$ as part of its device capabilities to the sender (user B) such that a reduced FoV can be sent to the user A in an optimal manner in terms of, for example, necessary bitrate. This may be sent at the beginning of the session or during the session, for example, via SDP as needed by the user A. By the sender (user B) sending a reduced high-resolution FoV, the bandwidth requirement may be reduced as compared to the receiving user reducing the FoV after receiving the original FoV.

Figure 6:
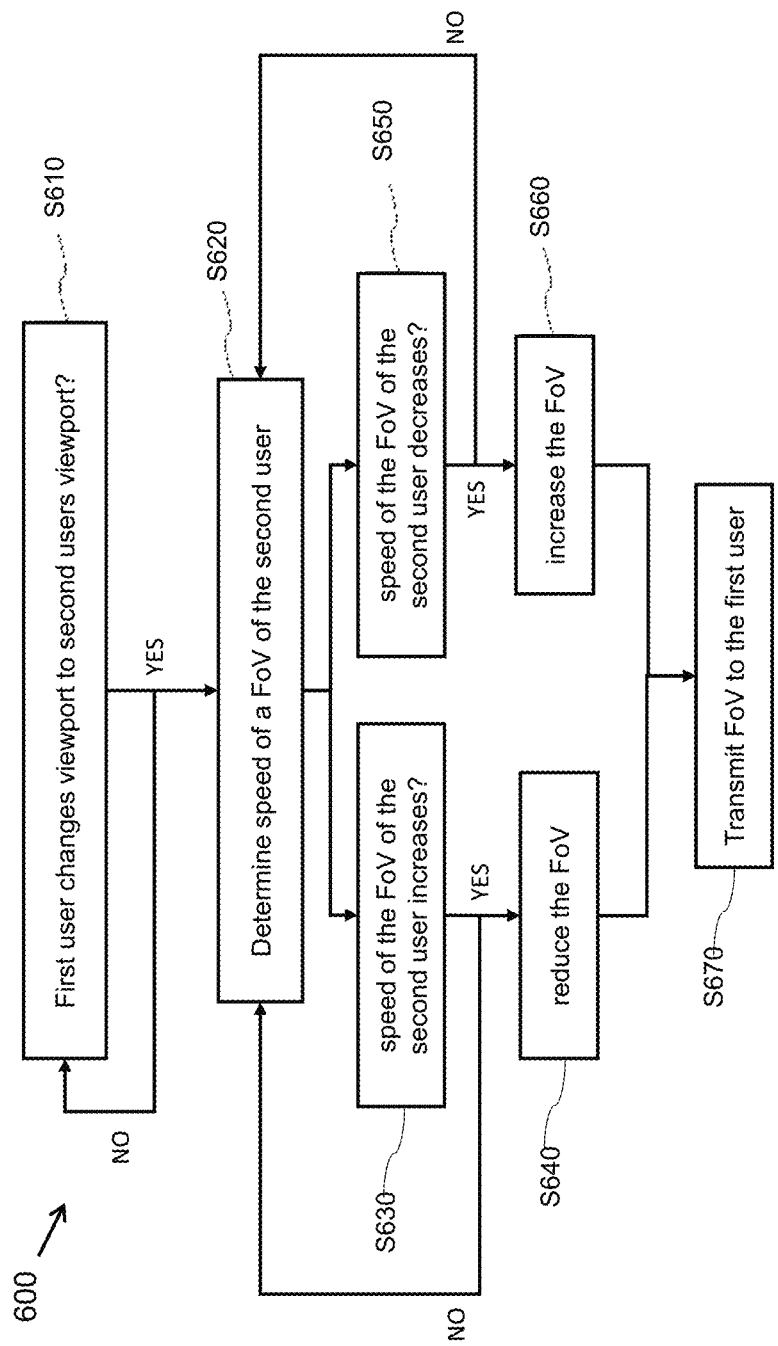
FIG. 6 is a flowchart of a method for subsiding motion sickness when a user is following the viewport of another user in a streaming session, according to embodiment.

FIG. 6 is a flowchart of a method 600 for subsiding motion sickness when a first user is following the viewport of a second user in a streaming session, according to an embodiment.

As shown in FIG. 6, in step S610, the method 600 includes determining whether a first user changes their viewport to the viewport of a second user. If NO at step S610, the method 600 repeats step S610. If YES at step S610, the method 600 continues to step S620.

In step S620, the method 600 determines the FoV of the first user based on the speed of the FoV of the second user. As the speed of the FoV of the second user changes, the FoV of the first user will be determined and/or modified. The FoV of the second user is an original FoV that has not been reduced or increased.

In step S630, the method 600 determined whether the speed of the FoV of the second user increases. If YES at step S630, the FoV of the first user is reduced (S640) and the reduced FoV is transmitted to the first user (S670). If NO at step S630, the method 600 returns back to step S620.

In step S650, the method 600 determined whether the speed of the FoV of the second user decreases. If YES at step S650, the FoV of the first user is increased (S660) and the increased FoV is transmitted to the first user (S670). If NO at step S650, the method 600 returns back to step S620.

Although FIG. 6 shows example blocks of the method, in some implementations, the method may include additional blocks, fewer blocks, different blocks, or differently arranged blocks than those depicted in FIG. 6. Additionally, or alternatively, two or more of the blocks of the method may performed in parallel.

The techniques for subsiding motion sickness for immersive teleconferencing and telepresence, described above, can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
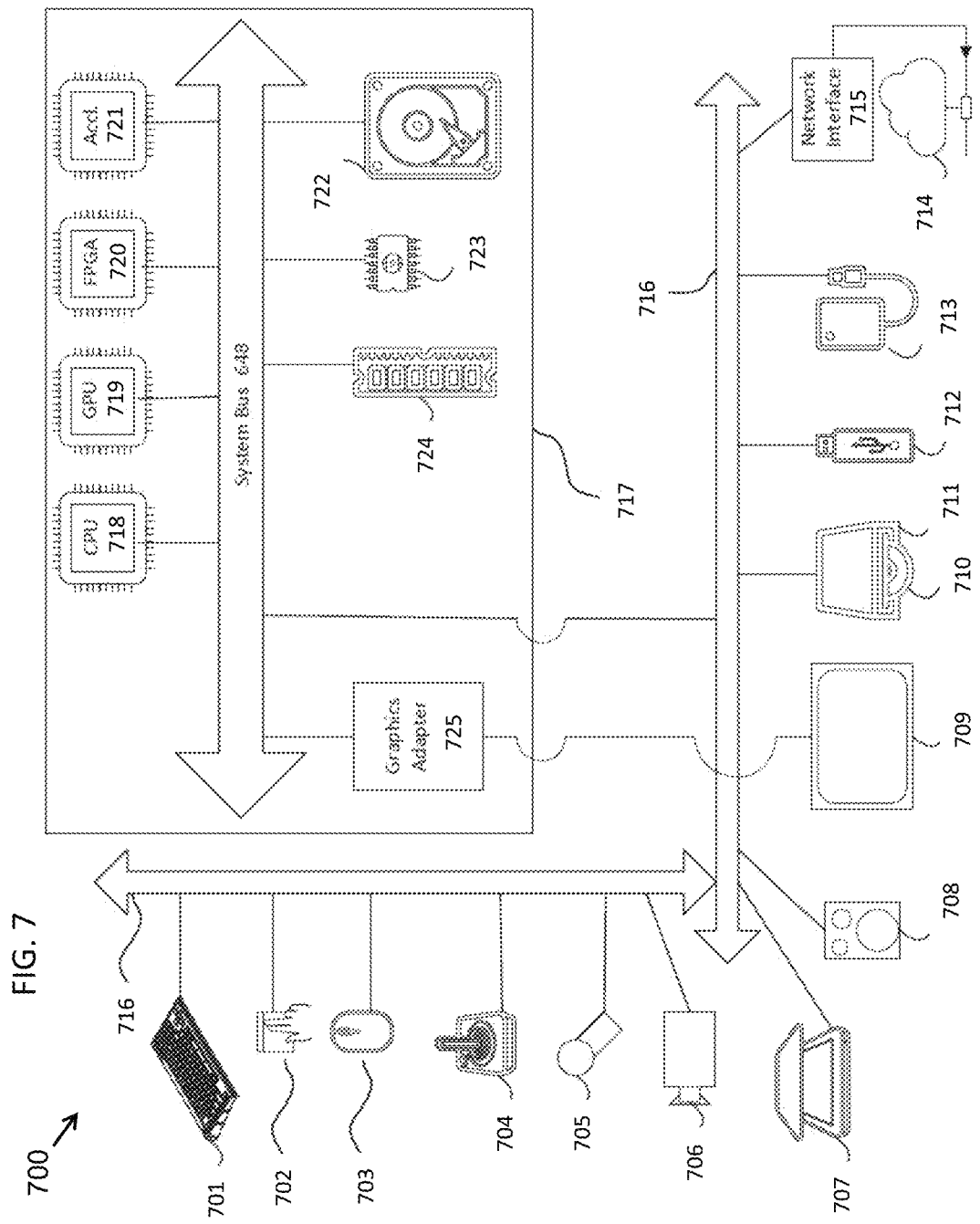
FIG. 7 is a schematic illustration of a computer system, according embodiments.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as keystrokes, swipes, data glove movements), audio input (such as voice, clapping), visual input (such as gestures), olfactory input. The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 701, trackpad 702, mouse 703, touch-screen 709, data-glove, joystick 704, microphone 705, camera 706, scanner 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 709, data-glove, or joystick 704, but there can also be tactile feedback devices that do not serve as input devices), audio output devices (such as: speakers 708, headphones), visual output devices (such as screens 709 to include CRT screens, LCD screens, plasma screens, OLED screens, each with or without touch-screen input capability, each with or without tactile feedback capability— some of which may be capable to output two-dimensional visual output or more than three-dimensional output through means such as stereographic output; virtual-reality glasses, holographic displays and smoke tanks), and printers.

Computer system 700 can also include human accessible storage devices and their associated media such as optical media including CD/DVD ROM/RW 711 with CD/DVD or the like media 710, thumb-drive 712, removable hard drive or solid-state drive 713, legacy magnetic media such as tape and floppy disc, specialized ROM/ASIC/PLD based devices such as security dongles, and the like.

Those skilled in the art should also understand that term "computer-readable media" as used in connection with the presently disclosed subject matter does not encompass transmission media, carrier waves, or other transitory signals.

Computer system 700 can also include an interface 715 to one or more communication networks 714. Networks 714 can, for example, be wireless, wireline, optical. Networks 714 can further be local, wide-area, metropolitan, vehicular and industrial, real-time, delay-tolerant, and so on. Examples of networks 714 include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks 714 commonly require external network interface adapters (e.g., graphics adapter 725) that attached to certain general-purpose data ports or peripheral buses 716 (such as, for example, USB ports of the computer system 700; others are commonly integrated into the core of the computer system 700 by attachment to a system bus as described below (for example Ethernet interface into a PC computer system or cellular network interface into a smartphone computer system). Using any of these networks 714, computer system 700 can communicate with other entities. Such communication can be uni-directional, receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 717 of the computer system 700.

The core 717 can include one or more Central Processing Units (CPU) 718, Graphics Processing Units (GPU) 719, specialized programmable processing units in the form of Field Programmable Gate Areas (FPGA) 720, hardware accelerators 721 for certain tasks, and so forth. These devices, along with Read-only memory (ROM) 723, Random-access memory (RAM) 724, internal mass storage such as internal non-user accessible hard drives, SSDs, and the like 722, may be connected through a system bus 726. In some computer systems, the system bus 726 can be accessible in the form of one or more physical plugs to enable extensions by additional CPUs, GPU, and the like. The peripheral devices can be attached either directly to the core's system bus 726, or through a peripheral bus 716. Architectures for a peripheral bus include PCI, USB, and the like.

The CPUs 718, GPUs 719, FPGAs 720, and accelerators 721 can execute certain instructions that, in combination, can make up the aforementioned computer code. That computer code can be stored in ROM 723 or RAM 724. Transitional data can be also be stored in RAM 724, whereas permanent data can be stored, for example, in the internal mass storage 722. Fast storage and retrieval to any of the memory devices can be enabled through the use of cache memory, which can be closely associated with one or more CPU 718, GPU 719, mass storage 722, ROM 723, RAM 724 and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example and not by way of limitation, the computer system having architecture 700, and specifically the core 717 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 717 that are of non-transitory nature, such as core-internal mass storage 722 or ROM 723. The software implementing various embodiments of the present disclosure can be stored in such devices and executed by core 717. A computer-readable medium can include one or more memory devices or chips, according to particular needs. The software can cause the core 717 and specifically the processors therein (including CPU, GPU, FPGA, and the like) to execute particular processes or particular parts of particular processes described herein, including defining data structures stored in RAM 724 and modifying such data structures according to the processes defined by the software. In addition or as an alternative, the computer system can provide functionality as a result of logic hardwired or otherwise embodied in a circuit (for example, accelerator 721), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for subsiding motion sickness when a first user is following a viewport of a second user in a streaming session, the method comprising:
   determining a first field of view (FoV), based on a speed of a second FoV of the second user, wherein the second FoV of the second user is an original FOV with no reduction;
   generating a modified first FoV by at least one of (1) reducing the first FoV based on the speed of the second FoV of the second user increasing, and (2) increasing the first FoV based on the speed of the second FoV of the second user decreasing;
   determining the modified first FoV by applying a reducing factor to the second FoV of the second user, wherein the reducing factor corresponds to adjusting a resolution of a portion of an image while a content of the image is maintained, and the reducing factor is based on a response of the first user to motion, and wherein the modified first FoV corresponds to the reducing factor multiplied by the second FoV and divided by the speed of the second FoV;
   transmitting a minimum FoV through a Session Description Protocol (SDP) to the second user at a beginning of the streaming session; and
   transmitting the modified first FoV to the first user and presenting the modified first FoV to the first user as a new viewport,
   wherein the minimum FoV is defined by the first user, and the modified first FoV is not less than the minimum FoV, and
   wherein the reducing factor is defined by the first user based on a sensitivity of the first user to motion sickness.

2. The method of claim 1, further comprising determining the speed of the second FoV of the second user to be a speed of a head mounted display worn by the second user or the speed of a handheld device operated by the second user.

3. The method of claim 1, further comprising transmitting, based on the first FoV being reduced, a region between the second FoV of the second user and the modified first FoV in low resolution.

4. The method of claim 1, further comprising transmitting the reducing factor through a Session Description Protocol (SDP) to the second user,
   wherein the reducing factor is defined by the first user.

5. The method of claim 4, wherein the reducing factor is transmitted to the second user at a beginning of the streaming session or during the streaming session.

6. A device for subsiding motion sickness when a first user is following a viewport of a second user in a streaming session, the device comprising:
   at least one memory configured to store program code; and
   at least one processor configured to read the program code and operate as instructed by the program code, the program code including:
   determining code configured to cause the at least one processor to determine a first field of view (FoV), based on a speed of a second FoV of the second user, wherein the second FoV of the second user is an original FoV with no reduction;
   modifying code configured to cause the at least one processor to generate a modified first FoV by at least one of (1) reducing the first FoV based on the speed of the second FoV of the second user increases, and (2) increasing the first FoV based on the speed of the second FoV of the second user decreases; and transmitting code configured to cause the at least one processor to:

transmit a minimum FoV through a Session Description Protocol (SDP) to the second user at a beginning of the streaming session; and transmit the modified first FoV to the first user and present the modified first FoV to the first user as a new viewport, wherein the determining code is further configured to cause the at least one processor to determine the modified first FoV by applying a reducing factor to the second FoV of the second user, wherein the reducing factor corresponds to adjusting a resolution of a portion of an image while a content of the image is maintained, and the reducing factor is based on a response of the first user to motion, and wherein the modified first FoV corresponds to the reducing factor multiplied by the second FoV and divided by the speed of the second FoV, wherein the minimum FoV is defined by the first user, and the modified first FoV is not less than the minimum FoV, and wherein the reducing factor is defined by the first user based on a sensitivity of the first user to motion sickness.

7. The device of claim 6, wherein the determining code is further configured cause the at least one processor to determine the speed of the second FoV of the second user to be a speed of a head mounted display worn by the second user or the speed of a handheld device operated by the second user.

8. The device of claim 6, wherein the transmitting code is further configured to cause the at least one processor to transmit, based on the first FoV being reduced, a region between the second FoV of the second user and the modified first FoV in low resolution.

9. The device of claim 6, wherein the transmitting code is further configured to cause the at least one processor to transmit the reducing factor through a Session Description Protocol (SDP) to the second user at a beginning of the streaming session or during the streaming session, and wherein the reducing factor is defined by the first user.

10. A non-transitory computer readable medium storing instructions, the instructions comprising: one or more instructions that, when executed by at least one processor of a device for subsiding motion sickness when a first user is following a viewport of a second user in a streaming session storing instructions that, cause the at least one processor to:

determine a first field of view (FoV), based on a speed of a second FoV of the second user, wherein the second FoV of the second user is an original FoV with no reduction;

generate a modified first FoV by at least one of (1) reducing the first FoV based on the speed of the second FoV of the second user increasing, and (2) increasing the first FoV based on the speed of the second FoV of the second user decreasing;

determine the modified first FoV by applying a reducing factor to the second FoV of the second user, wherein the reducing factor corresponds to adjusting a resolution of a portion of an image while a content of the image is maintained, and the reducing factor is based on a response of the first user to motion, and wherein the modified first FoV corresponds to the reducing factor multiplied by the second FoV and divided by the speed of the second FoV;

transmit a minimum FoV through a Session Description Protocol (SDP) to the second user at a beginning of the streaming session; and transmit the modified first FoV to the first user and present the modified first FoV to the first user as a new viewport, wherein the minimum FoV is defined by the first user, and the modified first FoV is not less than the minimum FoV, and wherein the reducing factor is defined by the first user based on a sensitivity of the first user to motion sickness.

11. The non-transitory computer readable medium of claim 10, wherein the instructions, when executed by the at least one processor, further causes the at least one processor to determine the speed of the second FoV of the second user to be a speed of a head mounted display worn by the second user or the speed of a handheld device operated by the second user.

12. The non-transitory computer readable medium of claim 10, wherein the instructions, when executed by the at least one processor, further causes the at least one processor to transmit, based on the first FoV being reduced, a region between the second FoV of the second user and the modified first FoV in low resolution.

13. The non-transitory computer readable medium of claim 10, wherein the instructions, when executed by the at least one processor, further causes the at least one processor to transmit the reducing factor through a Session Description Protocol (SDP) to the second user at a beginning of the streaming session or during the streaming session, and wherein the reducing factor is defined by the first user.

* * * * *